US007774112B2

(12) United States Patent
Nahapetian

(10) Patent No.: US 7,774,112 B2
(45) Date of Patent: Aug. 10, 2010

(54) SYSTEM AND METHOD FOR FLIGHT DATA RECORDING

(75) Inventor: Armen Nahapetian, Glendale, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 1184 days.

(21) Appl. No.: 10/951,005

(22) Filed: Sep. 27, 2004

(65) Prior Publication Data

US 2006/0069477 A1 Mar. 30, 2006

(51) Int. Cl.
*G01M 17/00* (2006.01)

(52) U.S. Cl. ................................ 701/35; 701/3; 701/14; 370/442; 340/436; 360/5

(58) Field of Classification Search ................. 340/436, 340/524, 692, 870.09, 94; 370/412, 442; 369/21-22; 701/3, 14, 35; 360/5; 123/478
See application file for complete search history.

(56) References Cited

U.S. PATENT DOCUMENTS 3,209,079 A * 9/1965 Skalwold ........................ 360/8
3,581,014 A * 5/1971 Vogel et al. .................... 369/21
4,409,670 A * 10/1983 Herndon et al. ............... 701/14
4,625,697 A * 12/1986 Hosaka ........................ 123/478
4,642,775 A 2/1987 Cline et al.
4,646,241 A * 2/1987 Ratchford et al. ............. 701/14
4,660,145 A * 4/1987 Hansen ........................ 701/14
4,686,532 A 8/1987 McAulay
4,729,102 A 3/1988 Miller, Jr. et al.
4,783,744 A 11/1988 Yueh
4,804,937 A 2/1989 Barbiaux et al.
4,807,158 A 2/1989 Blanton et al.
4,872,182 A 10/1989 McRae et al.
4,926,331 A 5/1990 Windle et al.

(Continued)

FOREIGN PATENT DOCUMENTS

AU 2002353934 A1 * 5/2003

(Continued)

OTHER PUBLICATIONS

Sampling theory for neuromagnetic detector arrays; Ahonen, A.I.; Hamalainen, M.S.; Ilmoniemi, R.J.; Kajola, M.J.; Knuutila, J.E.T.; Simola, J.T.; Vilkman, V.A.; Biomedical Engineering, IEEE Transactions on; vol. 40, Issue 9, Sep. 1993 pp. 859-869; Digital Object Identifier 10.1109/10.245606.*

(Continued)

*Primary Examiner*—Cuong Nguyen
(74) *Attorney, Agent, or Firm*—K&L Gates LLP

(57) ABSTRACT

A method and system for acquiring aircraft parameters that includes sampling an aircraft parameter during a first sampling period, recording the full value of the aircraft parameter sampled during the first sampling period, then sampling the aircraft parameter during a fixed number of subsequent consecutive sampling periods, and recording the change between the value of the aircraft parameter sampled in the subsequent sampling periods and the value of the aircraft parameter sampled in the prior sampling period. A method and system for constructing a data stream that includes merging a voluntary data stream and the mandatory parameters and storing the merged data stream in a flight data recorder while maintaining the certification of the flight data recorder.

16 Claims, 7 Drawing Sheets

120

| Parameter (32) | Bits Required in Sampling Period 94 | Bits Required in Sampling Period 96 | Bits Required in Sampling Period 98 | Bits Required in Sampling Period 100 | Bits Required in Sampling Period 102 | Bits Required in Sampling Period 104 | Bits Required in Sampling Period 106 | Bits Required in Sampling Period 108 | Total Bits Required in Sampling Frame 112 | |
|---|---|---|---|---|---|---|---|---|---|---|
| 38 Pitch Angle | 9 Bits | 3 Bits | 3 Bits | 3 Bits | 3 Bits | 3 Bits | 3 Bits | 3 Bits | 30 Bits | 130 |
| 40 Roll Angle | 9 Bits | 3 Bits | 3 Bits | 3 Bits | 3 Bits | 3 Bits | 3 Bits | 3 Bits | 30 Bits | 132 |
| 42 Airspeed | 10 Bits | 3 Bits | 3 Bits | 3 Bits | 3 Bits | 3 Bits | 3 Bits | 3 Bits | 31 Bits | 134 |
| 44 Elevator | 10 Bits | 3 Bits | 3 Bits | 3 Bits | 3 Bits | 3 Bits | 3 Bits | 3 Bits | 31 Bits | 136 |
| 46 Aileron | 10 Bits | 3 Bits | 3 Bits | 3 Bits | 3 Bits | 3 Bits | 3 Bits | 3 Bits | 31 Bits | 138 |
| 48 Control Wheel | 12 Bits | 3 Bits | 3 Bits | 3 Bits | 3 Bits | 3 Bits | 3 Bits | 3 Bits | 33 Bits | 140 |
| 50 Rudder | 10 Bits | 3 Bits | 3 Bits | 3 Bits | 3 Bits | 3 Bits | 3 Bits | 3 Bits | 31 Bits | 142 |
| 52 Radio Altitude | 12 Bits | 8 Bits | 8 Bits | 8 Bits | 8 Bits | 8 Bits | 8 Bits | 8 Bits | 68 Bits | 144 |
| 124 | 82 Bits | 29 Bits | 29 Bits | 29 Bits | 29 Bits | 29 Bits | 29 Bits | 29 Bits | 285 Bits | 146 |
| | 285 Bits Per Frame 112 (128) | | | | | | | | | |

126 126

FIGURE 5

U.S. PATENT DOCUMENTS 4,939,652 A 7/1990 Steiner
4,955,066 A 9/1990 Notenboom
4,987,541 A * 1/1991 Levente et al. ................ 701/35
5,124,915 A 6/1992 Krenzel
5,157,615 A 10/1992 Brodegard et al.
5,185,700 A 2/1993 Bezos et al.
5,283,767 A 2/1994 McCoy
5,351,194 A 9/1994 Ross et al.
5,359,446 A 10/1994 Johnson et al.
5,400,018 A 3/1995 Scholl et al.
5,440,544 A 8/1995 Zinser, Jr.
5,445,347 A 8/1995 Ng
5,463,656 A 10/1995 Polivka et al.
5,519,663 A 5/1996 Harper, Jr. et al.
5,524,272 A 6/1996 Podowski et al.
5,550,738 A 8/1996 Bailey et al.
5,652,717 A 7/1997 Miller et al.
RE35,590 E 8/1997 Bezos et al.
5,680,328 A 10/1997 Skorupski et al.
5,707,237 A 1/1998 Takemoto et al.
5,714,948 A 2/1998 Farmakis et al.
5,748,143 A 5/1998 Melvin, Jr. et al.
5,761,625 A 6/1998 Honcik et al.
5,793,813 A 8/1998 Cleave
5,794,145 A 8/1998 Milam
5,805,828 A 9/1998 Lee et al.
5,826,195 A 10/1998 Westerlage et al.
5,844,473 A 12/1998 Kaman
5,852,825 A 12/1998 Winslow
5,890,079 A 3/1999 Levine
5,901,142 A 5/1999 Averbuch et al.
5,907,302 A 5/1999 Melvin, Jr.
5,919,239 A 7/1999 Fraker et al.
5,920,321 A 7/1999 Owen et al.
5,926,759 A 7/1999 Severwright
5,930,680 A 7/1999 Lusignan
5,943,399 A 8/1999 Grabowsky et al.
5,974,349 A 10/1999 Levine
5,999,112 A 12/1999 Omori
6,047,165 A 4/2000 Wright et al.
6,075,969 A 6/2000 Lusignan
6,091,361 A 7/2000 Davis et al.
6,091,936 A 7/2000 Chennakeshu et al.
6,104,914 A 8/2000 Wright et al.
6,107,960 A 8/2000 Krasner
6,108,523 A 8/2000 Wright et al.
6,148,179 A 11/2000 Wright et al.
6,154,636 A 11/2000 Wright et al.
6,154,637 A 11/2000 Wright et al.
6,160,998 A 12/2000 Wright et al.
6,163,681 A 12/2000 Wright et al.
6,167,238 A 12/2000 Wright
6,167,239 A 12/2000 Wright et al.
6,169,881 B1 1/2001 Astrom et al.
6,173,159 B1 1/2001 Wright et al.
6,181,990 B1 1/2001 Grabowsky et al.
6,199,045 B1 3/2001 Giniger et al.
6,240,341 B1 5/2001 Snyder
6,252,540 B1 6/2001 Hale et al.
6,292,878 B1 9/2001 Morioka et al.
6,308,044 B1 10/2001 Wright et al.
6,308,045 B1 10/2001 Wright et al.
6,311,060 B1 10/2001 Evans et al.
6,314,416 B1 11/2001 Schiefele
6,317,659 B1 11/2001 Lindsley et al.
6,330,462 B1 12/2001 Chen
6,353,734 B1 3/2002 Wright et al.
6,363,248 B1 3/2002 Silverman
6,363,323 B1 3/2002 Jones
6,487,500 B2 11/2002 Lemelson et al.
6,526,337 B2 2/2003 Gardner
6,597,892 B1 7/2003 Caldwell, III et al.
6,650,970 B2 11/2003 Odashima et al.
6,654,386 B2 11/2003 Nahapetian et al.
6,681,158 B2 1/2004 Griffith et al.
6,707,422 B2 3/2004 Sheynblat et al.
6,747,577 B2 6/2004 Chakravarty et al.
6,785,526 B2 8/2004 McLain et al.
6,816,728 B2 11/2004 Igloi et al.
6,819,982 B2 11/2004 Doane
6,898,492 B2 5/2005 De Leon
6,965,816 B2 11/2005 Walker
6,968,260 B2 * 11/2005 Okada et al. .................. 701/35
2001/0019966 A1 9/2001 Idaka
2002/0035415 A1 3/2002 Gardner
2002/0045973 A1 4/2002 Odashima et al.
2003/0060941 A1 3/2003 Griffith et al.
2003/0065428 A1 4/2003 Mendelson et al.
2003/0202527 A1 10/2003 Nahapetian
2003/0203734 A1 10/2003 Igloi
2003/0209653 A1 * 11/2003 Feldsine et al. ......... 250/214 R
2004/0204081 A1 10/2004 Steenberge et al.
2004/0220748 A1 * 11/2004 Feldsine et al. ............... 702/19
2006/0069477 A1 * 3/2006 Nahapetian .................. 701/35
2007/0152054 A1 * 7/2007 Bonavides et al. .......... 235/454

FOREIGN PATENT DOCUMENTS

CN 1405037 A * 3/2003
CN 1746657 A * 3/2006
EP 0407179 A1 1/1991
EP 0408094 B1 1/1991
EP 0774274 B1 5/1997
EP 1179725 A2 2/2002
EP 1613535 B1 1/2007
EP 1101177 B1 12/2007
GB 2276006 9/1994
GB 2285688 A * 7/1995
JP 07002022 A * 1/1995
JP 07205898 A * 8/1995
JP 08198187 A * 8/1996
JP 09226694 A * 9/1997
TW 220464 B1 * 8/2004
WO WO 94/14273 6/1994
WO WO 97/06602 2/1997
WO WO 98/27698 6/1998
WO WO 98/39699 11/1998
WO WO 02/01755 A1 1/2002
WO WO 02/08057 A1 1/2002
WO WO 03/023322 A2 3/2003
WO WO 03091714 A1 * 11/2003
WO WO 2007001370 A2 * 1/2007

OTHER PUBLICATIONS

Recognition of temporally changing action potentials in multiunit neural recordings; Mirfakhraei, K.; Horch, K.; Biomedical Engineering, IEEE Transactions on; vol. 44, Issue, Feb. 1997 pp. 123-131; Digital Object Identifier 10.1109/10.552242.*

Interactive data analysis: the Control project; Hellerstein, J.M.; Avnur, R.; Chou, A.; Hidber, C.; Olston, C.; Raman, V.; Roth, T.; Haas, P.J.; Computer, vol. 32, Issue 8, Aug. 1999 pp. 51-59; Digital Object Identifier 10.1109/2.781635.*

Experimentation and Analysis: SigLab/MATLAB Data Acquisition Experiments for Signals and Systems; Cavicchi, T.J.; Education, IEEE Transactions on; vol. 48, Issue 3, Aug. 2005 pp. 540-550; Digital Object Identifier 10.1109/TE.2005.852595.*

Modelling, evaluation, and adaptive control of an instrumentation system; Waheed, A; Rover, D.T.; Mutka, M.W.; Smith, H.; Bakic, A.; Real-Time Technology and Applications Symposium, 1997. Proceedings., Third IEEE; Jun. 9-11, 1997 pp. 100-110 ; Digital Object Identifier 10.1109/RTTAS.1997.601348.*

A high speed digital recording system for continuous measurements of secondary radar channel activity; Saunders, K.W.; Digital Avionics Systems Conferences, 2000. Proceedings. DASC. The 19$^{th}$; vol. 2, Oct. 7-13, 2000 pp. 7B4/1-7B4/7 vol. 2; Digital Object Identifier 10.1109/DASC.2000.884926.*

System design for automated airborne data acquisition; Blyler, J.E.; Prabhakar, J.C.; Circuits and Systems, 1991., Proceedings of the 34th Midwest Symposium on; May 14-17, 1991 pp. 966-969 vol. 2; Digital Object Identifier 10.1109/MWSCAS.1991.251975.*

A Magnetic Field Response Recorder: A New Tool for Measurement Acquisition; Woodard, Stanley E.; Taylor, Bryant D.; Sensors, 2006. 5th IEEE Conference on; Oct. 2007 pp. 789-797; Digital Object Identifier 10.1109/ICSENS.2007.355587.*

IEEE Std 1616—2004 IEEE Standard for Motor Vehicle Event Data Recorders (MVEDRs); 2005 pp. 0_-163.*

IEEE Std 1616—2004 IEEE Standard for Motor Vehicle Event Data Recorders (MVEDRs); 2005 pp. 0_1-163.*

A Magnetic Field Response Recorder: A New Tool for Measurement Acquistion; Woodward, Stanley E.; Taylor, Bryant D.; Sensors, 2006. 5th IEEE Conference on; Oct. 2007 pp. 789-797; Digital Object Identifier 10.1109/ICSENS.2007.355587.*

David Evans, "Safety: On Camera: Inside and Outside," *Avionics Magazine*, Aug. 1, 2003, printed on Jan. 26, 2005, 6 pages.

International Search Report, Application No. PCT/US05/33034.

Written Opinion, Application No. PCT/US05/33034.

Jenkins M D Ed—Institute of Electrical and Electronics Engineers: "Integrated voice and data communications for air traffic service applications" Proceedings of the Digital Avionics Systems Conference. Seattle, Oct. 5-8, 1992, New York, IEEE, US, vol. Conf. 11, Oct. 5, 1992, pp. 31-36, XP010106697 ISBN: 0-7803-0820-4.

Rivadeneyra: J.M. Rivadeneyra and J. Miguel. "A communication architecture to access data services through GSM," 7th IFIP/ICCC Conference on Information Networks and Data Communications, Jun. 15-17, 1998 Aveiro, Portugal. Published Jun. 1998.

Arinc'591: Arinc Characteristic No. 591. Published Jul. 1972.

Spec: TS/SMG-010234QR1, Digital cellular Telecommunications system (Phase 2+); High Speed Circuit Switched Data (HSCSD)—Stage 1 (GSM 02.34 version 5.2.1). Published Jul. 1997.

RFC 791: Internet protocol. Published Sep. 1981.

RFC 793: Transmission control protocol. Published Sep. 1981.

RFC 1661: The point-to-point protocol (PPP). Published Jul. 1994.

Freescale: Integrated multiprotocol processor with Ethernet. Published 1995.

RFC 959: File transfer protocol (FTP). Published Oct. 1985.

Hsu W H et al: "Automatic Synthesis of Compression Techniques for Heterogeneous Files" Software Practice & Experience, John Wiley & Sons Ltd. Chichester, GB, vol. 25, No. 10, Oct. 1, 1995, pp. 1097-1116, XP000655539 ISSN: 0038-0644 p. 1102.

McDade T M: "Advances in flight data acquisition and management systems" Digital Avionics Systems Conference, 1998. Proceedings., 17TH DASC. The AIAA/IEEE/SAE Bellevue, WA, USA Oct. 31-Nov. 7, 1998, New York, NY, USA, IEEE, US, vol. 2, Oct. 31, 1998.

Hoyme K et al: "ARINC 629 and Safebus: Data Buses for Commercial Aircraft" Scientific Honeyweller, Honeywell'S Corporate. Minneapolis, US, vol. 11, No. 1, Sep. 21, 1991.

Unknown, Air Accidents Investigation Branch: Jan. 2006 G-BVET, unknown date, from http://www.aaib.gov.uk/publicatins/formal_reports/.

Unknown, Order 7610.4K Special Military Operations, US Department of Transportation, FAA Feb. 19, 2004.

Office Action issued in U.S. Appl. No. 09/126,156 dated Feb. 9, 2000.

Notice of Allowability in U.S. Appl. No. 09/126,156 dated Aug. 29, 2000.

Office Action issued in U.S. Appl. No. 10/128,873 dated Jan. 2, 2004.

Notice of Allowability in U.S. Appl. No. 10/128,873 dated Sep. 7, 2004.

Office Action issued in U.S. Appl. No. 10/413,128 dated Mar. 25, 2005.

Office Action issued in U.S. Appl. No. 10/413,128 dated Sep. 21, 2005.

Office Action issued in U.S. Appl. No. 10/413,128 dated Jun. 12, 2006.

Office Action issued in U.S. Appl. No. 10/413,128 dated Nov. 17, 2006.

Request for Re-Examination in U.S. Appl. No. 90/006,742 dated Aug. 12, 2003.

Determination—Reexamination Ordered in U.S. Appl. No. 90/006,742 dated Nov. 10, 2003.

Re-Examination Non-Final Office Action in U.S. Appl. No. 90/006,742 dated Jun. 3, 2005.

Notice of Intent to Issue a Reexam Certificate in U.S. Appl. No. 90/006,742 dated Oct. 3, 2005.

Supplementary European Search Report in Application No. EP 05858138.0 dated Feb. 19, 2010. (9 pages).

* cited by examiner

30

| | 32 | 34 | 36 |
|---|---|---|---|
| | Parameter | Number of Bits Designated to Record the Actual Value of the Parameter | Physical Range of the Parameter |
| 38 | Pitch Angle | 9 Bits | ±180 deg. |
| 40 | Roll Angle | 9 Bits | ±180 deg. |
| 42 | Airspeed | 10 Bits | 512 knots |
| 44 | Elevator | 10 Bits | ±50 deg. |
| 46 | Aileron | 10 Bits | ±50 deg. |
| 48 | Control Wheel | 12 Bits | ±85 deg. |
| 50 | Rudder | 10 Bits | ±50 deg. |
| 52 | Radio Altitude | 12 Bits | ±8192 ft. |

FIGURE 2

80

| Parameter (32) | Bits Required to Record the Full Actual Value During the First Sampling Period (62) | Bits Required to Record the Difference Between Samples in the Second Sampling Period and the First Sampling Period (64) | Bits Required to Record the Difference Between Samples in the Third Sampling Period and the Second Sampling Period (66) | Bits Required to Record the Difference Between Samples in the Fourth Sampling Period and the Third Sampling Period (68) |
|---|---|---|---|---|
| 38 Pitch Angle | 9 Bits | 6 Bits | 6 Bits | 6 Bits |
| 40 Roll Angle | 9 Bits | 6 Bits | 6 Bits | 6 Bits |
| 42 Airspeed | 10 Bits | 6 Bits | 6 Bits | 6 Bits |
| 44 Elevator | 10 Bits | 6 Bits | 6 Bits | 6 Bits |
| 46 Aileron | 10 Bits | 6 Bits | 6 Bits | 6 Bits |
| 48 Control Wheel | 12 Bits | 6 Bits | 6 Bits | 6 Bits |
| 50 Rudder | 10 Bits | 6 Bits | 6 Bits | 6 Bits |
| 52 Radio Altitude | 12 Bits | 10 Bits | 10 Bits | 10 Bits |
| | 82 Bits Total | 52 Bits Total | 52 Bits Total | 52 Bits Total |
| | 69 238 Bits Per Frame | | | |

FIGURE 3

90

| Parameter (32) | Number of Bits Designated to Record the Actual Value of the Parameter (34) | Number of Bits Designated to Record the Sign and Value of the Difference (92) | Maximum Change Supported in 500 ms Sampling Period (94) |
|---|---|---|---|
| 38 Pitch Angle | 9 Bits | 3 Bits | ±0.5 deg. |
| 40 Roll Angle | 9 Bits | 3 Bits | ±1 deg. |
| 42 Airspeed | 10 Bits | 3 Bits | 1.5 knots |
| 44 Elevator | 10 Bits | 3 Bits | ±0.1 deg. |
| 46 Aileron | 10 Bits | 3 Bits | ±0.1 deg. |
| 48 Control Wheel | 12 Bits | 3 Bits | ±3 deg. |
| 50 Rudder | 10 Bits | 3 Bits | ±0.1 deg. |
| 52 Radio Altitude | 12 Bits | 8 Bits | ±15.8 ft. |

FIGURE 4

120

| Parameter (32) | Bits Required in Sampling Period 94 | Bits Required in Sampling Period 96 | Bits Required in Sampling Period 98 | Bits Required in Sampling Period 100 | Bits Required in Sampling Period 102 | Bits Required in Sampling Period 104 | Bits Required in Sampling Period 106 | Bits Required in Sampling Period 108 | Total Bits Required in Sampling Frame 112 | |
|---|---|---|---|---|---|---|---|---|---|---|
| 38 Pitch Angle | 9 Bits | 3 Bits | 3 Bits | 3 Bits | 3 Bits | 3 Bits | 3 Bits | 3 Bits | 30 Bits | 130 |
| 40 Roll Angle | 9 Bits | 3 Bits | 3 Bits | 3 Bits | 3 Bits | 3 Bits | 3 Bits | 3 Bits | 30 Bits | 132 |
| 42 Airspeed | 10 Bits | 3 Bits | 3 Bits | 3 Bits | 3 Bits | 3 Bits | 3 Bits | 3 Bits | 31 Bits | 134 |
| 44 Elevator | 10 Bits | 3 Bits | 3 Bits | 3 Bits | 3 Bits | 3 Bits | 3 Bits | 3 Bits | 31 Bits | 136 |
| 46 Aileron | 10 Bits | 3 Bits | 3 Bits | 3 Bits | 3 Bits | 3 Bits | 3 Bits | 3 Bits | 31 Bits | 138 |
| 48 Control Wheel | 12 Bits | 3 Bits | 3 Bits | 3 Bits | 3 Bits | 3 Bits | 3 Bits | 3 Bits | 33 Bits | 140 |
| 50 Rudder | 10 Bits | 3 Bits | 3 Bits | 3 Bits | 3 Bits | 3 Bits | 3 Bits | 3 Bits | 31 Bits | 142 |
| 52 Radio Altitude | 12 Bits | 8 Bits | 8 Bits | 8 Bits | 8 Bits | 8 Bits | 8 Bits | 8 Bits | 68 Bits | 144 |
| 124 | 82 Bits | 29 Bits (126) | 29 Bits (126) | 29 Bits (126) | 29 Bits (126) | 29 Bits (126) | 29 Bits (126) | 29 Bits (126) | 285 Bits | 146 |
| | 285 Bits Per Frame 112 (128) | | | | | | | | | |

FIGURE 5

SYSTEM AND METHOD FOR FLIGHT DATA RECORDING

BACKGROUND

The present invention is directed generally to aircraft avionics flight data recorder systems and methods for accident and incident investigation and, more particularly, to cost reduction methods for flight data recording systems including new data recording methods and methods for building and certifying flexible recording systems without the need for costly re-certification efforts.

With each latest rulemaking by national and international Aircraft Regulatory agencies new requirements are mandated for recording flight data using a Flight Data Recorder System (FDRS). In one embodiment the FDRS, consists of the Flight Data Recorder (FDR) and the Flight Data acquisition unit (FDAU). This system is used for recording data associated with various aircraft parameters. The FDRS is primarily an investigative tool for reconstructing and evaluating the performance of an aircraft prior to and during an accident or incident. During an investigation, the data recorded in the FDR is used to better assist the investigation of such accidents and incidents.

The FDAU acquires and the FDR records aircraft parameters at a predetermined sampling rate and may, in some instances, filter the recorded data. The FDRS may be used to record data associated with an aircraft's flight control systems such as, for example, pitch angle, roll angle, airspeed, elevator position, aileron position, control wheel position, rudder position, and radio altitude, among other types of aircraft data and/or parameters. For example, the FDRS may be used to record event signals that may be associated with one or more aircraft parameters such as engine hydraulic system data from a pressure switch or sensor, brake pressure data from a pressure sensor, aircraft ground/air speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) from the captain's clock, and other similar event signals such as door open/closed sensors, and the like.

The FAA and National Transportation Safety Board (NTSB) often issue safety recommendations and requirements for new regulations and frequently includes mandates for sampling and recording parameters at increasingly higher sampling and recording rates. These higher sampling and recording mandates generally increase the volume of recorded data beyond the capacity of an aircraft's existing FDR and often requires the replacement of the FDR or the complete FDR system. Present implementations of FDRS, however, treat the sampling rates and recording rates as one requirement. Thus, any increase in the sampling rate results in a direct increase in the recording rate and thus a direct increase in the volume of storage required in the FDR to store the data, and a direct increase in the bandwidth of the information channel between the FDAU and the FDR.

Non-deterministic and deterministic data compression are ways to decrease the overall storage requirements of the FDR. Conventional non-deterministic data compression systems and methods, however, are prone to circumstances where the data compression produces little or no advantage. Furthermore, it is difficult if not impossible to calculate the required minimum storage capacity based on non-deterministic data compression techniques to satisfy all possible changes in the data. This is because it is difficult to determine ahead of time how much the data will be compress, and thus is difficult to provide a FDR with a minimum storage capacity to handle changes in the data. Without the ability to calculate the minimum storage requirements ahead of time, a mandatory flight data recording system would not benefit fully simply by this data compression alone and would be forced to allocate minimum storage for the worst-case scenario. Furthermore, some conventional non-deterministic data compression methods require a certain amount of data to be buffered before compression can be applied. Conventional non-deterministic compression techniques, therefore, fail to meet the requirements imposed on FDRS where the data must be transferred to crash protected media within fractions of a second after being sampled. Thus, conventional non-deterministic compression techniques may free up little or no storage volume for recording the additional data at the higher sampling rates.

Conventional deterministic methods may be used to reduce the volume of recorded data by packing the aircraft parameters into words, bus-switching the parameters, and dropping the less significant bits of parameters. Although these conventional deterministic methods reduce the required volume of storage, used alone they do not provide an adequate solution to the increased storage requirements.

Thus, there is a need in the art for a system and method for recording aircraft related data at the mandated higher sampling rates without the need for a proportional increase in the bandwidth and storage capacity of and without the need to completely replace an existing FDR, which may be costly to do in either case. Accordingly, there is a need in the art for systems and methods that can accommodate the mandated higher sampling rates that utilize the existing FDR data storage capacity for recording the higher volume of data produced by the higher sampling rates. Such systems and methods might prevent the costly upgrade of the FDR hardware and thus lead to significant cost savings.

The EUROCAE document ED112 provides a likely basis for any European rulemaking with respect to recording flight data for accident and/or incident investigation. Section 1-1.3.5 of this document provides that it is highly desirable to have voluntary parameters recorded alongside the mandatory parameters on the crash protected FDR. The recording system for the mandatory parameters is subject to costly certification efforts anytime a change is made. On the other hand, the recording of voluntary parameters merely requires some flexibility in allowing operators to make changes as needed, sometime even on a daily basis. Accordingly, there is need in the art for a system and method to address regulatory requirements, such as those described in the ED112 document, that provide the requisite flexibility for recording voluntary parameters while simultaneously protecting the certification of the mandatory recording. Such new system and method for building and certifying a mandatory flight data recording system would provide the flexibility of permitting changes to be made to the recorded parameter set without the need for re-certifying the mandatory parameter recording aspect of the recording system.

It is known in the art to merge data recording streams in situations where it is necessary to certify the recorded flight data, or where the merged stream has been certified as a fixed non-flexible set of parameters comprising the flight data. There is a need in the art, however, for a system and method of injecting of an uncontrolled and uncertified voluntary recorded flight data stream into the mandatory and certified recorded flight data stream to add some flexibility to the certification of the mandatory recording function.

SUMMARY

In one embodiment, the present invention relates to a method for acquiring aircraft parameters that includes sampling an aircraft parameter during a first sampling period; recording the full value of the aircraft parameter sampled during the first sampling period; sampling the aircraft parameter during a limited but fixed number of subsequent sampling periods, wherein the subsequent sampling periods consecutively follows the first sampling period; and recording the change in value of the aircraft parameter sampled in the subsequent sampling periods from the value of the aircraft parameter sampled in the prior sampling period. Then repeating the above sequence (a frame) until the recording stops. The change in values may be represented by the difference of the values, the ratio of values or some other function of the two values.

In another embodiment, the present invention provides a system for acquiring aircraft parameter data that includes a data acquisition unit; and a flight data recorder in communication therewith; wherein a sampling function of the data acquisition unit is disassociated from a recording function of the flight data recorder.

In yet another embodiment, the present invention provides a system for recording aircraft parameter data that includes a voluntary data acquisition unit or function; a mandatory data acquisition unit in communication therewith for receiving a voluntary data stream and combining it with the mandatory streams into a single merged data stream; and a flight data recorder in communication with the mandatory acquisition unit, wherein the flight data recorder is for storing the merged data stream; wherein merging the voluntary and mandatory data streams does not adversely affect the mandatory data stream and does not requires the re-certification of the flight data recorder.

In still another embodiment, the present invention provides a method for constructing a data stream that includes merging a voluntary data stream and a mandatory data stream; storing the merged data stream in a flight data recorder; and maintaining the certification of the flight data recorder.

These and various other features of the embodiments of the present invention will become apparent to those skilled in the art from the following description and corresponding drawings. As will be realized, the present invention is capable of modification without departing from the scope of the invention. Accordingly, the description and the drawings are to be regarded as being illustrative in nature, and not as being restrictive.

BRIEF DESCRIPTION OF THE DRAWINGS

Various embodiments of the present invention will be described in conjunction with the following figures, wherein like parts are referenced by like numerals throughout the several views and wherein:

FIG. 2 is one embodiment of a chart illustrating a sample application based on actual aircraft parameter recording rates of a B767 aircraft;

FIG. 3 is one embodiment of a chart illustrating the distribution of bits over a four second sampling frame;

FIG. 4 is one embodiment of a chart illustrating the distribution of aircraft parameters and their change;

FIG. 5 is one embodiment of a chart illustrating the allocation of bits for each sampling period for each aircraft parameter over the entire sampling frame;

DESCRIPTION

Figure 1:
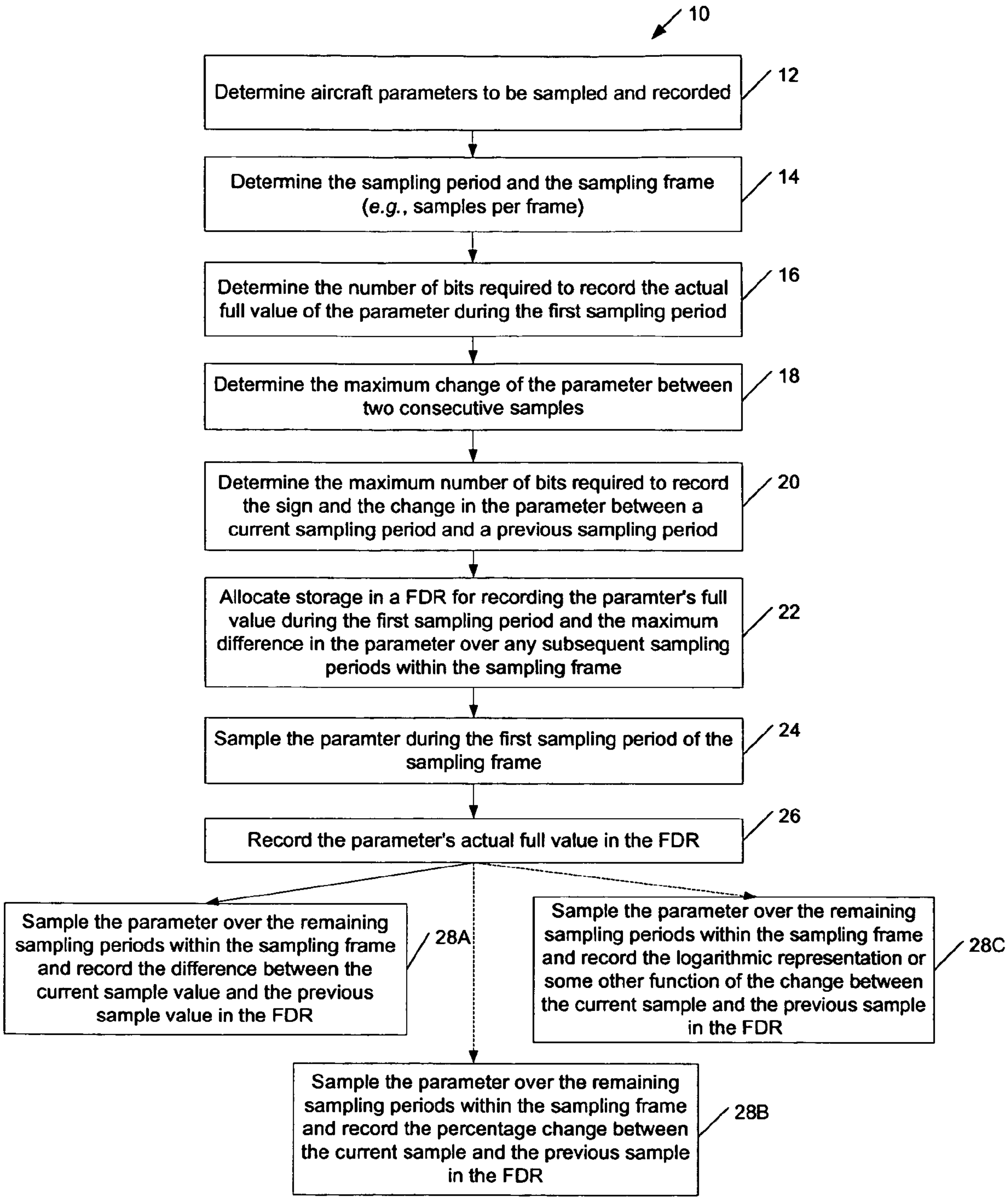
FIG. 1 is one embodiment of a flow diagram illustrating a method for acquiring aircraft data parameters.

It is to be understood that the figures and descriptions of the present invention are simplified to illustrate elements that are relevant for a clear understanding of the present invention while eliminating, for purposes of clarity, other elements found in a conventional aircraft flight data recording systems and methods. It can be recognized that other elements may be desirable and/or required to implement certain aspects of the present invention. A discussion of such elements is not provided, however, where the elements are well known to those skilled in the art and does not facilitate a better understanding of the present invention.

Various embodiments of an aircraft parameter data recording system and method are provided where the sampling function is disassociated with the data recording function. Thus, aircraft parameters may be sampled at increasingly higher sampling rates, as may be mandated by regulatory agencies, without proportionally increasing the volume of recorded data, which may otherwise require an upgrade or a complete replacement of a FDR.

In one embodiment, a system and method are provided wherein aircraft related information is acquired and recorded over predetermined time units. As discussed previously, the aircraft related information may include, for example, data associated with an aircraft's flight control systems such as, for example, pitch angle, roll angle, airspeed, elevator position, aileron position, control wheel position, rudder position, and radio altitude, among other types of aircraft data and/or parameters. For example, the FDRS may be used to record event signals that may be associated with one or more aircraft parameters such as engine hydraulic system data from a pressure switch or sensor, brake pressure data from a pressure sensor, aircraft ground/air speed data, flight number/leg data, aircraft heading data from an Inertial Reference Unit (IRU) and/or Electronic Flight Instrument System (EFIS), weight-on-wheels or weight-off-wheels data from an air/ground relay, Greenwich Mean Time (GMT) from the captain's clock, and other similar event signals such as door open/closed sensors, and the like.

Due to the repetitive nature of sampling and recording, where the repetition period is a fixed number of seconds called a "Frame," aircraft parameter data may be acquired and recorded over a predetermined number of samples "S" during each frame. The required bit length of each sample is determined by the type of parameter being sampled. For each sample of a predetermined parameter, therefore, a predetermined number of bits "B" are acquired and stored. Conventional FDR systems generally record, in each frame, a number of bits equal to the product of the required bit length "B" of the sampled parameter and the number of samples "S" per frame. Therefore, during a predetermined sampling frame, conventional FDR systems record "SB" bits, and the FDR requires a corresponding storage volume to record the maximum value that the sampled parameter may attain during any of the sampling periods over the sampling frame.

In one embodiment of the present invention, the total number bits to be recorded over a frame is:

$$\text{Frame Bit Allocation}=B+b(S-1) \quad (1)$$

Where "b" is the number of bits required to record the maximum possible change between a current sampled value and a previously sampled value where "b<B" and "S" is the number of samples per frame.

The description now turns to embodiments of an aircraft parameter data recording system and method wherein the aircraft parameter data sampling function is disassociated with the data recording function. Accident and incident investigators to reconstruct the behavior of various aircraft parameters by playing back the aircraft data stored in a FDR. The required fidelity (e.g., resolution) of the playback of an aircraft parameter is determined by recording a predetermined minimum number of bits per sampling period of the aircraft parameter and by recording a predetermined number of samples per unit time (i.e., the sampling frame). The unit of time for the sampling period or the sampling frame may be "one second," "half second period," "hour," and so on. For example, if an aircraft parameter requires a resolution of "B" bits per sample, and "S" samples per frame, a conventional aircraft data recording system needs to allocate a minimum storage capacity of "SB" bits per frame to record all the sampled data.

The recording method according to various embodiments does not require buffering of the recorded aircraft data to reduce the allocated storage space. Rather, the method, provides a determinate amount of compression by sampling an aircraft's parameter and independently recording the sampled value of the aircraft's parameter, so that the two functions (e.g., sampling and recording) are disassociated. Although the aircraft parameter may be sampled at a rate of "SB" bits per unit time, it is recorded in accordance with the following method.

FIG. 1 is a flow diagram 10 that illustrates a method for acquiring aircraft data parameters where the sampling function is disassociated from the data recording function. In one embodiment, the method may be used to acquire and record aircraft data parameters 32 (e.g., see FIG. 2) over predetermined time units. For example, as described in more detail below, in one embodiment the aircraft data parameters 32 may be sampled and recorded in one second sampling periods over a four second frame. In one embodiment, the aircraft parameters may be sampled and recorded in 500 ms sampling periods 94, 96, 98, 100, 102, 104, 106, 108 (see FIG. 5) over a four second frame 112 (see FIG. 5). At block 12, the aircraft parameters to be sampled and recorded is determined. At block 14, the sampling periods and the sampling frame are determined and the aircraft acquisition/recording system is set-up such that the aircraft parameters are sampled over a plurality of sampling periods within the sampling frame. At block 16, the number of bits, or length, required to record the actual full value of each aircraft parameter during the first sampling period of the frame are determined. At block 18, the maximum change that each parameter may undergo within each of the remaining sampling periods within the sampling frame are determined. At block 20, after determining the maximum possible change of each parameter within the sampling period, the number of bits to record a representation of the maximum change between the value of the parameter between the current sampling period and the previous sampling is determined. At block 22, a predetermined volume of storage is allocated in a FDR for recording the parameter's full value in the first sampling period, and for recording the maximum change in the parameter over the subsequent sampling periods within the sampling frame. In one embodiment, equation (1) may be used to determine the allocation of bits per frame for a given parameter 12.

In operation, at block 24, a first sample of the aircraft parameter is taken during the first sampling period (e.g., one second, 500 ms, and the like). At block 26, the parameter's sampled value is recorded in its entirety in a FDR, for example. At block 28A, following the initial sampling period, the parameter is sampled over the subsequent sampling periods within the sampling frame. Now, however, only the difference in value between a current sample and a previous sample is recorded. Recording only the difference in value between consecutive samples instead of recording the parameter's full value requires a much smaller storage allocation in the FDR. Those skilled in the art will appreciate that the storage usage depends on the maximum change that a parameter may undergo within a given sampling period. In one embodiment, at block 28B, a percentage change (e.g., increase or decrease) in value of the parameter between consecutive samples may be recorded. In another embodiment, at block 28C, a logarithmic representation or another function of the difference in value between consecutive samples may be recorded.

A smaller number of bits can thus be allocated for recording the actual change (difference and/or the percentage change and/or the logarithmic representation of the difference and/or some other function of the change) of any samples between consecutive sampling periods rather than allocating storage for the full value as is required with conventional mandatory flight data recording systems. The number of bits for recording a parameter's change in value between consecutive samples is smaller because there are physical limitations with respect to how much the aircraft parameters can possibly change during a fixed sampling period. Accordingly, if the number of bits required to record the change between a current value and a previous value is "b", where "b<B", then the number of bits per frame required to store the samples may be represented, for example, by equation (1) as "B+b(S−1)", rather than "SB", the number of bits required for conventional recording systems. This method reduces the FDR's storage volume requirements and, therefore, an existing FDR may still be used in applications where a parameter's sampling rate is increased to improve overall performance or because of regulatory mandates. Utilization of existing FDR hardware provides a cost savings to the aircraft operator and/or owner.

FIG. 2 is a chart 30 that illustrates a sample application based on actual aircraft parameter recording rates of a B767 aircraft. The chart 30 illustrates the parameters 32 to be recorded, the number of bits or length 34 required to record the maximum actual value of the parameter 32 over the sampling period, and the physical range 36 of the parameter 32. Some of the parameters 32 illustrated in the chart 30 may be slated for increased sampling rates by accident investigators and regulatory agencies. In this particular configuration of the aircraft, the number of samples per unit time "S" is four and the sampling period is one second. Thus, the parameters 32 are sampled over a one second sampling and total of four samples are recorded, for example. The total number of samples per frame "S" will vary according to the particular application. The parameters 32 include, but are not limited to: pitch angle 38, roll angle 40, airspeed 42, elevator 44, aileron 46, control wheel 48, rudder 50, and radio-altitude 52, for example. In the illustrated example, the pitch angle 38 requires the allocation of 9 bits to record the parameter's maximum actual value over the sampling period. The roll angle 40 requires 9 bits, the airspeed 42 requires 10 bits, the elevator 44 requires 10 bits, the aileron 46 requires 10 bits, the control wheel 48 requires 12 bits, the rudder 50 requires 10 bits, and the r-altitude 52 requires 12 bits, for example. The ranges for each of these parameters 32 is as follows: the pitch angle 38 is ±180°, the roll angle 40 is ±180°, the airspeed 42 is 512 knots, the elevator 44 is ±50°, the aileron 46 is ±50°, the control wheel 48 is ±85°, the rudder 50 is ±50°, and the radio-altitude 52 is ±8192 ft., for example.

FIG. 3 is a chart 80 that illustrates one example of the distribution of bits 62, 64, 66, 68 over the four second sampling frame in accordance with one embodiment of the present invention. As discussed previously, the method provides that the number of bits 62 allocated for the first one second sampling period is the number of bits required to record the full value of the sampled parameter 32. The samples taken during the subsequent sampling periods within the four second frame, however, require only the allocation of the number of bits needed to store the actual difference between the value of a current sample and the value of the previous sample rather than recording the parameter's 32 full actual value. For example, during the first one second sampling period, the number of bits 62 to be allocated is the number of bits required to store the full value of the sampled parameter 32. During the subsequent, second, one second sampling period, the number of bits 64 to be allocated for storage is only what is required to store the maximum possible change in value that the parameter 32 may undergo during the second sampling period relative to the first sampling period. Likewise, during the subsequent, third, one second sampling period, the number of bits 66 to be allocated for storage is only what is required to store the maximum possible change in value that the parameter 32 may undergo during the third sampling period relative to the second sampling period. Similarly, during the subsequent, fourth, one second sampling period, the number of bits 68 to be allocated for storage is only what is required to store the maximum possible change in value that the parameter 32 may undergo during the fourth sampling period relative to the third sampling period. Thus, only a fraction of the available FDR storage volume needs to be allocated to record the eight parameters 32 over the four second frame. In this example, the total number of bits to be allocated for the entire frame is 238 as shown in cell 69. Although in this example the change in the number of bits required to record is expressed as the difference between samples, as discussed previously, the actual change in terms of difference and/or the percentage change and/or the logarithmic representation of the difference and/or some other function of the change may be utilized or determined without departing from the scope of the present invention.

FIG. 4 is a chart 90 that illustrates the distribution of aircraft parameters 32, the number of bits designated to record the actual parameter value, i.e., the bit length 34, the number of bits designated to record the sign and the value of the difference 92 between consecutive 500 ms sampling periods 94, 96, 98, 100, 102, 104, 106, 108, and the maximum change 110 that the parameter 32 can support in a 500 ms sampling period (i.e., at twice the sampling rate of one second for the example shown in chart 80 of FIG. 3). To double the sampling rate and yet allow for larger changes than those represented in the chart 90, more bits may be budgeted or, alternatively, a non-linear scale may be used to record the changes. In this example where the sampling rate is doubled to one sample per 500 ms over the four second frame conventional methods would require the allocation of 656 bits over the four second frame. As shown below, however, one embodiment of the method requires only the allocation of 285 bits over the four second frame. This reduced bit allocation value may be achieved because there is a physical limitation of the maximum change a parameter 32 may undergo from sample to sample.

In the example illustrated in the chart 90, the number of bits to be allocated for the for storing the maximum value of each parameter 32 within the first 500 ms sampling period 94 is: nine bits for the pitch angle 38 and the roll angle 40 parameters; ten bits for the airspeed 42, elevator 44, aileron 46, and rudder 50 parameters; and twelve bits for the control wheel 48 and the radio-altitude 52 parameters. Subsequent 500 ms sampling periods 96, 98, 100, 102, 104, 106, 108, however, require the designation of only the number of bits needed to record the maximum possible change in the physical parameter over each 500 ms period relative to the previous sampling period. For each of these parameters 32, the number of bits designated to record the sign and the value of the difference in the measured parameter relative to the previous sampling period is: three bits for the pitch angle 38, roll angle 40, airspeed 42, elevator 44, aileron 46, control wheel 48, and rudder 50 parameters; and eight bits for the radio altitude 52 parameter. During each 500 ms sampling period 96, 98, 100, 102, 104, 106, 108 the maximum change of the parameters 32 is: ±0.5° for the pitch angle 38; ±1.0° for the roll angle 40; ±1.5 knots for the airspeed 42; ±0.1° for the elevator 44; ±0.1° for the aileron 46; ±3° for the control wheel 48; ±0.1° for the rudder 50; and ±15.8 ft. for the radio altitude 52. Accordingly, after the actual value is initially recorded in the first 500 ms sampling period 94, the FDR only needs to allocate the number of bits necessary to record the difference in the maximum change in any of the parameters 32 over the remaining 500 ms sampling periods 96, 98, 100, 102, 104, 106, 108.

FIG. 5 is a chart 120 that illustrates the total number of bits to be allocated over the sampling frame 112. At double the sampling rate of two samples per second (i.e., one sample every 500 ms) the number of bits required to store all eight parameters 32 over the four second frame 112 is 285 bits, for example. At a 500 ms sampling period and a four second frame "S", the number of samples taken by the acquisition system is eight samples per frame 112. In the first 500 ms sampling period 94 of the frame 112, the number of bits to be allocated is the number of bits required to store the parameter's 32 full value. In the subsequent seven sampling periods 96, 98, 100, 102, 104, 106, 108 only the number of bits required to record the sign and the value difference of the parameter 32 that is supported within the 500 ms sampling period relative to the previous sampling period is recorded. In the first 500 ms second sampling period 94, the number of bits 124 to be allocated is 82 and that corresponds to the bits required to represent the parameter's 32 full value. The number of bits to be allocated to record each parameter's 32 full value during the first 500 ms sampling period 94 is: nine bits for the pitch angle 38 and the roll angle 40 parameters; ten bits for the airspeed 42, elevator 44, aileron 46, and rudder 50 parameters; and twelve bits for the control wheel 48 and the radio altitude 52 parameters, for a total of 82 bits as shown in cell 124. In the subsequent 500 ms sampling periods 96, 98, 100, 102, 104, 106, 108 the number of bits to be allocated for each parameter 32 to record the sign and the value of the difference in the measured parameter relative to the previous sampling period is: three bits for the pitch angle 38, roll angle 40, airspeed 42, elevator 44, aileron 46, control wheel 48, and rudder 50 parameters; and eight bits for the radio altitude 52 parameter, for a total of 29 bits as shown in each cell 126. Thus, the total number of bits to be allocated for the entire four second frame 112, as shown in cell 128, is:

$$\text{Total Bits per Frame}=82+29(7)=285 \text{ bits.} \quad (2)$$

As discussed previously, equation (1) also may be used to arrive at the total number of designated bits for each parameter for the entire four second frame 112:

$$B+b(S-1) \quad (1)$$

Where “S” is the predetermined number of samples per frame, “B” is the predetermined number of bits for recording the full actual value of the parameter, and “b” is the number of bits required to record the difference between a current value and a previous value, and where “b<B”. In the example illustrated in FIG. 5, chart 120, for the pitch angle 38 parameter:

B=9;

b=3; and

S=8.

Applying these values into equation (1) over the four second sampling frame 112 at a sampling period of 500 ms yields:

$$9+3(8-1)=30 \text{ bits.}$$

This is less than the conventional number of bits “SB” required to store the same parameter over the same four second sampling frame:

$$SB=4*9=36 \text{ bits.}$$

FIG. 5 also illustrates the allocation of bits for each sampling period 94, 96, 98, 100, 102, 104, 106, 108 for each aircraft parameter 32 over the entire sampling frame 112. For example, the total number of bits to be allocated are: 30 bits for the pitch angle 38 and the roll angle 40 parameters as shown at cells 130, 132, respectively, 31 bits for the airspeed 42, elevator 44, aileron 46, and rudder 50 parameters as shown at cells 134, 136, 138, and 142, respectively; 33 bits for the control wheel 48 parameter as shown at cell 140; and 68 bits for radio altitude 52 parameter as shown at cell 144. The total number of bits to be allocated for the frame is the sum of all the bits required to store each individual parameter 32, which is 285.

Furthermore, embodiments of the present invention provide a system and method for combining voluntary and mandatory aircraft parameters. The voluntary data includes data that is flexible and unspecified by government agencies and/or regulations. The mandatory data includes data that must be recorded in a FDR in accordance with current regulations and government agency mandates. Accordingly, the description now turns to the embodiments of the present invention that provide a system and method for combining the voluntary and mandatory aircraft data in such a way as to not adversely affect the certification of the mandatory data streams recorded in the FDR. The certifiable mandatory recording system merges (interlaces) the incoming voluntary data stream regardless of its content with the mandatory parameters, thus, the flexible and unspecified data voluntary data stream is included in the certification of the mandatory FDR system. Because the mandatory parameters and the components of the voluntary stream have fixed, predetermined locations in the merged stream to the FDR, the merger, cannot adversely affect the certification of the mandatory data stream and the system does require re-certification of the FDR when any changes are made to the recorded voluntary parameter set. The merged data stream may be routed to a voluntary data recorder as well as a certified (e.g., mandatory) FDR.

Figure 6:
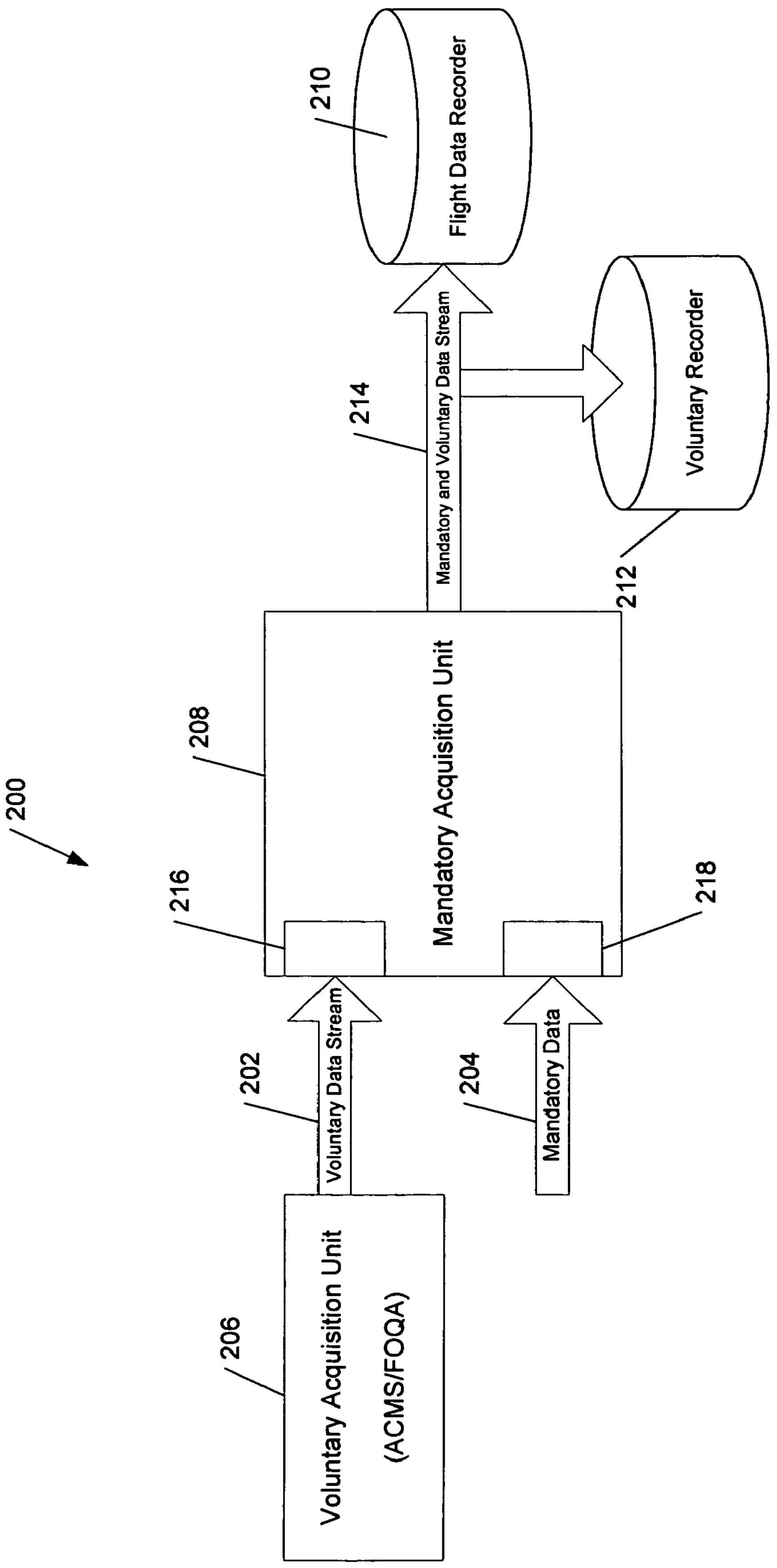
FIG. 6 illustrates one embodiment of a certifiable mandatory recording system for combining a voluntary data stream and a mandatory data stream.

FIG. 6 illustrates one embodiment of a certifiable mandatory recording system 200 for combining a voluntary data stream 202 and the mandatory data 204. The system 200 provides flexibility in recording aircraft parameters included in the voluntary data stream 202 alongside other aircraft parameters included in the mandatory data 204. The system 200 also provides the flexibility of allowing changes to the voluntary data stream 202 parameters without the need for re-certifying the FDR 210, for example.

The certifiable mandatory recording system 200 comprises a voluntary acquisition unit 206, such as, for example, a ACMS/FOQA acquisition unit, for acquiring a voluntary data stream 202, a mandatory acquisition unit 208 for receiving both the voluntary data stream 202 and the mandatory data 204. The system 200 also comprises a flight data recorder 210 (FDR) and in one embodiment also may comprise an optional voluntary recorder 212. The voluntary data stream 202 is acquired by the voluntary acquisition unit 206 and is fed to a first port 216 of the mandatory acquisition unit 208. The mandatory data 204 is acquired from the ports 218 of the mandatory acquisition unit 208. A merged data stream 214 comprising both the mandatory and the voluntary data 202, 204, respectively, is output by the mandatory acquisition unit 208 and is fed to the FDR 210. In one embodiment the merged data stream 214 also may be fed to the optional voluntary recorder 212.

In one embodiment, the mandatory data acquisition unit 208 includes voluntary data port(s) 216 and mandatory port(s) 218 (e.g., DITS429, ARINC717 and the like) dedicated to receive voluntary and mandatory data streams 202, 204, for example. In one embodiment, the first port 216 may be dedicated for receiving the voluntary data stream 202 from the voluntary acquisition unit 206 and the mandatory ports 218 may be dedicated for receiving the mandatory data 204 from various sensors and measurement devices used to monitor mandatory aircraft parameters. The voluntary and mandatory data 202, 204 received at the input ports 216, 218 are interlaced by the mandatory acquisition unit 208. The merged data stream 214 is provided to the FDR 210 even though part of it is un-identified at certification time. As part of the certification effort, the system 200 is able to merge the voluntary data stream 202 (regardless of content) with the mandatory data 204 without causing any adverse side effects to the recorded data (e.g., the merged data stream 214).

Figure 7:
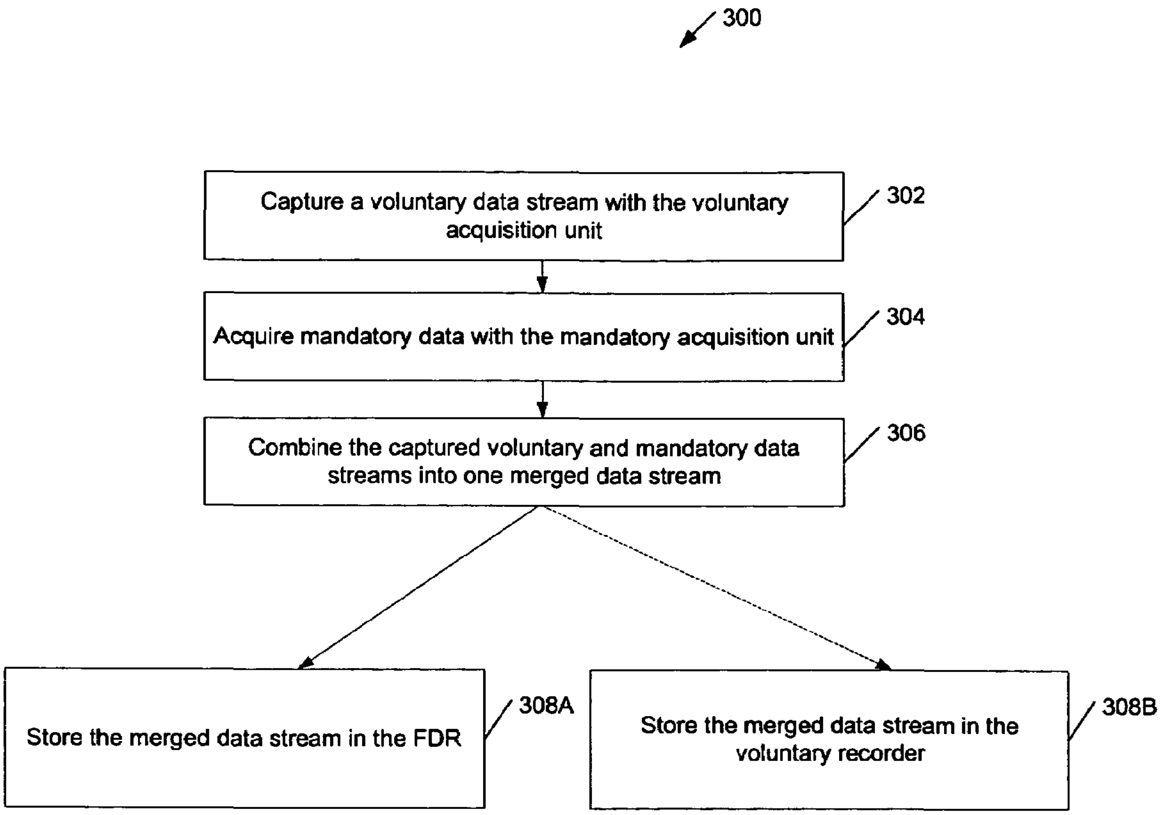
FIG. 7 is one embodiment of a flow diagram illustrating a method of constructing a merged data stream comprising at least one voluntary data stream and at least one mandatory data stream.

FIG. 7 is a flow diagram 300 that illustrates a method of constructing a merged data stream 214 comprising at least one voluntary data stream 202 and mandatory data 204. At block 302, the voluntary data stream 202 is captured by the voluntary acquisition unit 206, for example. At block 304, the mandatory data 204 is acquired by the mandatory acquisition 208, for example. At block 306, the captured voluntary data stream 202 and mandatory data 204 are combined into a single merged data stream 214. At block 308A, the merged data stream 214 is stored in the FDR 210. Alternatively, and/or simultaneously, at block 308B, the merged data may be stored in the optional voluntary recorder 212.

In one embodiment, the system 200 also may be used for acquiring aircraft data parameters where the sampling function is disassociated from the data recording function and where the aircraft data parameters are acquired and recorded over predetermined time units as described with reference to FIGS. 1-6. Those skilled in the art will appreciate, however, that conventional aircraft data recording systems also may be used to for acquiring aircraft data parameters where the sampling function is disassociated from the data recording function without departing from the scope of the claimed invention.

While embodiments of the present invention have been described in conjunction with its presently contemplated best mode, it is clear that it is susceptible to various modifications, modes of operation, and other embodiments, all within the ability of those skilled in the art and without exercise of further inventive activity. Further, while embodiments of the present invention have been described in connection with what is presently considered the most practical and preferred embodiments, it is to be understood that the invention is not limited to the disclosed embodiments, but on the contrary, it is intended to cover various modifications and equivalent arrangements included within the scope of the appended claims.

What is claimed is:

1. A system for acquiring aircraft parameters data, the system comprising:

a data acquisition unit configured to sample an aircraft parameter during a first sampling period; and sample the aircraft parameter during a plurality of subsequent sampling periods consecutively following the first sampling period; and a flight data recorder in communication therewith wherein the flight data recorder is configured to record the aircraft parameter's full value sampled during the first data period and record a change between the aircraft parameter's value sampled in one of the plurality of subsequent sampling period and the aircraft parameter's value sampled in a previous sampling period; and wherein a sampling function of the data acquisition unit is disassociated from a data recording function of the flight data recorder;

wherein the flight data recorder allocates a volume of storage for recording the aircraft parameter over a sampling frame comprising at least one sampling period according to:

$$B+b(S-1)$$

wherein "S" is a predetermined number of samples over the sampling frame, "B" is a predetermined number of bits for recording the full actual value of the aircraft parameter, and "b" is the number of bits required to record the change between the aircraft parameter's value in a current sampling period and its value in a previous sampling period, and wherein "b<B".

2. The system of claim 1, wherein the flight data recorder records a known function representing the change in the aircraft parameter between consecutive sampling periods.

3. The system of claim 1, wherein the flight data recorder records a logarithmic representation of the difference in the aircraft parameter between consecutive sampling periods.

4. The system of claim 1, wherein the plurality of sampling periods comprises a limited and fixed number of subsequent sampling periods.

5. The system of claim 1, wherein the flight data recorder records a difference between a value of the aircraft parameter sampled in a current sampling period and a value of the aircraft parameter sampled in a previous sampling period.

6. The system of claim 1, wherein the flight data recorder allocates a volume of storage for recording the aircraft parameter's full value during the first sampling period and the difference between the aircraft parameter's value in the first and subsequent sampling periods.

7. The system of claim 1, wherein the flight data recorder records a percentage change in the aircraft parameter between consecutive sampling periods.

8. A system for acquiring aircraft parameters data, the system comprising:

a data acquisition unit to sample an aircraft parameter during a first sampling period; and sample the aircraft parameter during a plurality of subsequent sampling periods consecutively following the first sampling period; and a flight data recorder to record the aircraft parameter's full value sampled during the first sampling period and, for each of the plurality of subsequent sampling periods, record a change between the aircraft parameter's value sampled in subsequent sampling period and the aircraft parameter's value sampled in a sampling period immediately preceding the subsequent sampling period.

9. The system of claim 8, wherein the plurality of sampling periods comprises a limited and fixed number of subsequent sampling periods.

10. The system of claim 9, wherein the flight data recorder records a difference between a value of the aircraft parameter sampled in a current sampling period and a value of the aircraft parameter sampled in a previous sampling period.

11. The system of claim 9, wherein the flight data recorder records a percentage change in the aircraft parameter between consecutive sampling periods.

12. The system of claim 9, wherein the flight data recorder records a logarithmic representation of the difference in the aircraft parameter between consecutive sampling periods.

13. The system of claim 9, wherein the flight data recorder records a known function representing the change in the aircraft parameter between consecutive sampling periods.

14. The system of claim 8, wherein the flight data recorder allocates a volume of storage for recording the aircraft parameter's full value during the first sampling period and the difference between the aircraft parameter's value in the first and subsequent sampling periods.

15. The system of claim 8, wherein the flight data recorder allocates a volume of storage for recording the aircraft parameter over a sampling frame, wherein the sampling frame comprises at least one sampling period.

16. The system of claim 15, wherein the flight data recorder allocates the volume of storage per frame for the aircraft parameter according to:

$$B+b(S-1)$$

wherein "S" is a predetermined number of samples over the sampling frame, "B" is a predetermined number of bits for recording the full actual value of the aircraft parameter, and "b" is the number of bits required to record the change between the aircraft parameter's value in a current sampling period and its value in a previous sampling period, and wherein "b<B".

* * * * *